United States Patent Office 3,217,310
Patented Nov. 9, 1965

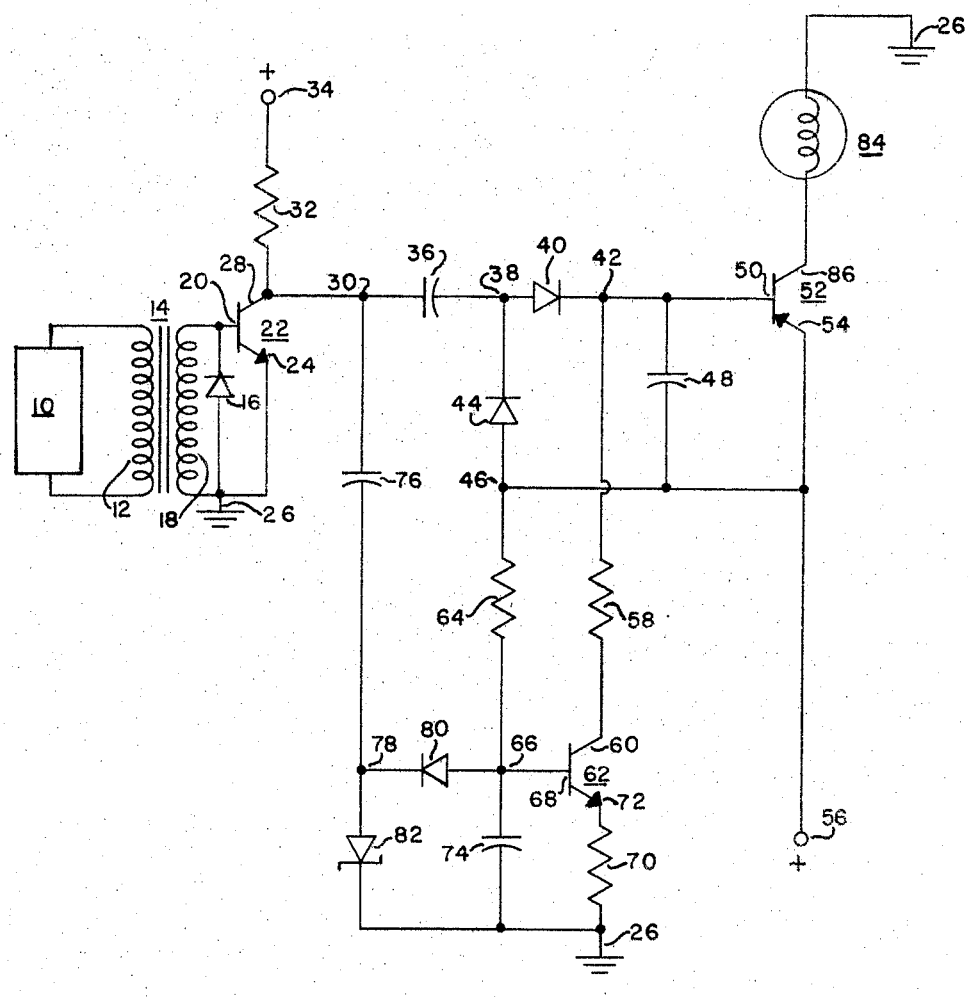

1

3,217,310
DISCHARGE CIRCUITRY FOR VOLTAGE DOUBLING AND SWITCHING CIRCUITRY
Robert P. Pearson, St. Paul, and Jack W. Schuck, Hopkins, Minn., assignors to Honeywell Inc., a corporation of Delaware
Filed Dec. 14, 1961, Ser. No. 159,390
7 Claims. (Cl. 340—248)

The present invention is concerned generally with switching circuits and more particularly with a switching circuit which will switch high power loads and not load down the source signal while still using a minimum of components.

In the prior art it has been known that in low power switching applications a voltage doubler can be used between the alternating signal supplying means and the load switching means to both rectify the alternating signal and to produce a high enough direct voltage signal to turn the output transistor or tube to a completely OFF condition and thereby eliminate current flow through a load means. As a voltage doubler requires the use of some type of storage device such as a capacitor to provide the voltage doubling action, another means is required to allow the capacitor or other storage device to discharge and allow the load switching means to turn to an ON condition when there is no longer a signal being supplied by the signal supplying means. If no such discharging apparatus is available, the load switching means will continue to stay in an OFF condition and there will be no indication that the condition has changed. As the magnitude of the current being controlled becomes greater and greater the value of this discharge device or resistor must become lower to provide adequate bias current for the transistor so as to allow complete conduction through the load means. As the discharge resistor is lowered in absolute value it imposes a greater burden on the signal supplying means and therefore requires a larger and more powerful signal to produce satisfactory operation.

By providing a second switch between the discharge resistor and ground so that effectively the discharge resistor is switched out of the circuit as long as a signal is being provided by the signal supplying means, this invention provides a means for switching high current loads while using a minimum of components and while requiring a small efficient signal from the condition sensing apparatus or signal supplying means.

It is therefore an object of this invention to provide improved switching apparatus.

It is a further object of this invention to provide switching apparatus whereby a minimum of components are used and whereby high currents may be switched while using a minimum amount of signal source power.

Other objects and advantages of this circuit will be understood from an examination of the specification in conjunction with the single drawing which shows one embodiment of the switching circuit disclosed by this application.

Describing the preferred embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

In the figure a condition sensing or signal supplying means 10 is connected between the ends of a primary winding 12 on a transformer 14. A diode 16 is connected between opposite ends of a secondary winding 18 on the transformer 14. One end of the secondary winding 18 is connected to a base lead 20 of an NPN transistor 22. The other end of the secondary winding 18 is connected to an emitter lead 24 of the transistor 22 and also to ground or a reference potential or a power terminal means 26. A collector lead 28 of the transistor 22 is connected to a junction point 30. A resistor or impedance means 32 is connected between the junction point 30 and a power supply terminal or power supply means 34. In this embodiment the terminal 34 is positive with respect to the other power supply terminal or reference potential 26. A capacitive means or impedance element 36 is connected between the junction point 30 and a junction point 38. A diode means or semiconductor element 40 is connected between the junction point 38 and the junction point 42 in a manner to allow current flow from the junction point 38 to the junction point 42. Another diode means or semiconductor element 44 is connected between the junction point 38 and a junction point 46 in a manner such that current flow is allowed from the junction point 46 to the junction point 38. A capacitor means or impedance element 48 is connected between the junction points 42 and 46. The junction point 42 is also connected to a base lead 50 of a PNP transistor 52. An emitter 54 of the transistor 52 is connected to the junction point 46 and also to a positive power terminal or power terminal supply means 56. Terminal 56 may be connected to the same source as 34 if desired. A resistor, impedance means, or discharge means 58 is connected between the junction point 42 and a collector 60 of an NPN transistor 62.

A resistive element or impedance means 64 is connected between the junction point 46 and a junction point 66. The junction point 66 is connected to a base lead 68 of the transistor 62. Another resistor or impedance means 70 is connected between an emitter lead 72 of the transistor 62 and power terminal or reference potential 26. A capacitive element or impedance means 74 is connected between the junction point 66 and reference potential 26. A capacitive element or impedance means 76 is connected between the junction point 30 and a junction point 78. Another diode means or semiconductor element 80 is connected between the junction points 66 and 78 in a manner to allow current flow from the junction point 66 to the junction point 78. A diode means or semiconductor element 82 is connected between the junction point 78 and the reference potential 26 in a manner to allow current flow from the junction point 78 to the reference potential 26. In this particular embodiment, element 82 is a Zener diode, although it may be a normal diode in some embodiments. Current flow will be allowed from the junction point 26 towards the junction point 78 when the voltage between these two points exceeds a predetermined Zener or breakdown voltage of the element 82. A load means or indicating means 84 is connected between a collector lead 86 of the transistor 52 and reference potential 26.

The diodes 40 and 44 along with the capacitors 36 and 48 constitute the complete voltage doubling or signal converting means whereby the alternating signal obtained at junction point 30 is converted to a direct voltage signal at junction point 42. The transistor 52 constitutes a load switching or circuit completing means. The diodes 80 and 82 along with the capacitors 74 and 76 constitute a second complete voltage doubling or signal converting means to change the A.C. signal at junction point 30 to a direct voltage signal at junction point 66. The transistor 62 constitutes a second switching means or second circuit completing means.

In operation a signal may be obtained from a condition sensing and signal supplying means such as presented in the co-pending application of Robert P. Pearson, now Patent 3,103,002 issued September 3, 1963, and assigned to the same assignee as the present invention whereby a signal is obtained whenever there is an absence of fluid between the elements of the condition sensor. As may be observed from the above-mentioned application the circuit would be simple to convert to provide an output signal only when fluid is present between the elements of the condition sensor, if this condition is desired. With a signal being supplied from the signal supplying means 10 and applied through the transformer 14, the alternating signal is presented at the junction point 30. As long as the signal obtained from the secondary winding 18 is of a small magnitude the diode 16 is inoperative to affect the circuit. As soon as the signal on the secondary 18 becomes greater than the forward voltage drop of the diode 16, current is passed through the diode upon each voltage half cycle where the base of transistor 22 is negative with respect to the emitter 24. This action prevents reverse voltage breakdown for emitter to base of the transistor 22. The signal at junction point 30 is applied through the capacitor 36 to the voltage doubling circuit utilizing the diodes 40 and 44 to provide a voltage across capacitor 48 which is approximately twice the peak magnitude of the signal appearing at junction point 30. In this embodiment of the circuit current will flow through diode 44 to the junction point 38 terminal of capacitor 36 on each negative half cycle of the signal obtained from collector 28 of transistor 22. As the voltage at junction point 30 rises in value towards the peak amplitude of the signal, current flows from the plate of the capacitor 36 connected to junction point 38 through the diode 40 to charge the capacitor 48. The positively charged plate of the capacitor 48 is connected to junction point 42. This action continues until the capacitor 48 is charged to approximately twice the voltage of the peak signal appearing at junction point 30. This high voltage direct current potential applied between the base 50 and the emitter 54 of the transistor 52 operates to hold the transistor 52 in an open or OFF condition and prevents current flow therethrough.

The same action as provided by the voltage doubling circuit utilizing the diodes 40 and 44 is obtained in the voltage doubling circuit utilizing diodes 80 and 82 with the exception that diode 82 in this particular embodiment is a Zener diode so that the voltage appearing across capacitor 74 is limited to approximately the Zener voltage of diode 82. The purpose of limiting this voltage is to prevent exceeding the reverse voltage emitter to base rating of transistor 62. As long as a signal is obtained at junction point 30 a direct voltage appears across capacitor 74 to keep the base 68 negative with respect to the emitter 72.

By keeping the transistor 62 in the OFF or open circuit condition as long as the signal is being obtained from the condition sensor 10, current is not allowed to discharge from the capacitor 48 through the resistor 58 to reference potential 26. Therefore, the only load on the condition sensing device and the transistor or signal supplying means 22 is the load necessary to initially charge the capacitor 48 and to continually keep the capacitor 74 in a charged condition. Since in one embodiment of the invention resistor 58 is approximately 300 ohms and resistor 64 is approximately 15,000 ohms, it can be observed that the loading of the signal supplying means 22 is greatly reduced since resistor 58 for all purposes can be considered to be removed from the circuit as long as a signal is being supplied at junction point 30.

When the condition being sensed changes to remove the signal being supplied to transistor 22, current flows from the power terminal 56 through the resistor 64 to discharge the capacitor 74 and thereby turn ON or complete the circuit in the switching means 62. By completing the circuit from junction point 42 to reference potential 26, the capacitor 48 can discharge through the resistor 58, the transistor junctions 60 and 72 of the transistor 62, through the resistor 70, to reference potential 26. As soon as the voltage at base 50 of transistor 52 becomes less than the supply voltage applied to terminal 56, the transistor 52 will turn to an ON or circuit completing condition and allow current flow from the terminal 56, through the transistor 52, through the load or indicating means 84, and to the other power terminal 26.

When a signal is again obtained from the sensing device 10, the capacitors 48 and 74 will again charge and turn the transistors 52 and 62 to OFF conditions thereby removing the indication from the indicating means 84 by depriving it of current flow therethrough.

If it is desired to use an NPN transistor in the position of present transistor 52, one way to do this is to provide NPN transistors at the points occupied by transistors 22 and 62 and reverse the polarity or direction of current flow of the five diodes shown in the circuit along with the change in polarity of the applied direct power supply.

It is to be understood that the form of the invention herewith shown and described is a preferred embodiment. Various changes may be made in the type and arrangement of parts. For example, as mentioned before, the transistors may be changed from one polarity to another or tubes may be inserted in place of the transistors in some instances. The present embodiment is shown as only utilizing one transistor in each of several places and it is to be understood that several transistors could just as well be used for some applications. It is realized that other modifications not mentioned will occur to those skilled in the art and we do not wish to be limited by the specific embodiment herein disclosed. We intend only to be limited by the appended claims.

We claim as our invention:

1. In indicating apparatus:
condition sensing means for supplying a first output signal upon the occurrence of a predetermined condition;
signal converting means for converting a received signal of one characteristic to a second output signal of another characteristic, said signal converting means including an input and an output, said input being connected to said condition sensing means to receive said first output signal therefrom, said signal converting means thereafter providing said second output signal;
a load circuit switch including first and second outputs connected to said signal converting means to receive said second output signal therefrom, said load circuit switch completing a circuit between said first and second outputs of said load circuit switch when said second output signal becomes less than a predetermined magnitude;
a second circuit switch including first and second outputs connected to said condition sensing means to receive said first output signal therefrom, a circuit being completed between said first and second outputs of said second circuit switch in the absence of said first output signal;
first power means for supplying power connected to said first output of said load circuit switch;
second power means for supplying power connected to said first output of said second circuit switch;
means for connecting said second output of said second circuit switch to said output of said signal converting means to complete a circuit to said second power means through said second circuit switch in the absence of said first output signal to reduce said second output signal below said predetermined magnitude and thereby close said load circuit switch; and
indicating means for providing an output indication connected between said second output of said load circuit switch and said second power means.

2. In indicating apparatus:
signal supplying means for supplying a first output signal for a predetermined condition being sensed;
first and second signal converting circuits each including an output, said first and second signal converting circuits being connected to said signal supplying means to receive said first output signal and said first and second signal converting circuits providing second and third output signals respectively;

a load circuit switch including first and second outputs connected to said first signal converting circuit to receive said second output signal and said load circuit switch completing a circuit between said first and second outputs of said load circuit switch when said second signal becomes less than a predetermined magnitude;

a second circuit switch including first and second outputs connected to said second signal converting circuit to receive said third output signal and said second circuit switch completing a circuit between said first and second outputs of said second circuit switch in the absence of said third output signal;

first means for completing a power circuit connected to said first output of said load circuit switch;

reference potential means connected to said first output of said second circuit switch;

connection means for connecting said second output of said second circuit switch to said output of said first signal converting circuit, said connection means completing a circuit to said reference potential means through said second circuit switch in the absence of said third output signal to thereby reduce said second output signal below said predetermined magnitude and thereby complete the circuit through said load circuit switch; and a load connected between said second output of said load circuit switch and said reference potential means for indicating current flow therethrough.

3. In indicating apparatus:

signal supplying means for supplying a first output signal for a predetermined condition being sensed;

first and second voltage doubling circuits, each including an output, connected to said signal supplying means for receiving said first output signal, said first and second voltage doubling circuits supplying second and third output signals at the respective outputs of said first and second voltage doubling circuits;

a load switch means, including first and second outputs, connected to said first voltage doubling circuit to receive said second output signal and said load switch completing a circuit between said first and second outputs of said load switch when said second output signal falls below a predetermined magnitude;

a second switch, including first and second outputs, connected to said second voltage doubling circuit to receive said third output signal and said second switch completing a circuit between said first and second outputs of said second switch upon an absence of said third output signal;

first and second power terminal means for supplying power connected to said first output of said load switch and to said first output of said second switch respectively;

impedance means for connecting said second output of said second switch to said output of said first voltage doubling circuit, said impedance means completing a circuit to said second power terminal means through said second switch in the absence of said third output signal to reduce said second output signal below said predetermined magnitude and thereby complete the circuit through said load switch; and a load connected between said second output of said load switch and said second power terminal means for indicating current flow therethrough.

4. In switching apparatus:

condition sensing means for providing an alternating output signal upon the occurrence of a predetermined condition;

a transformer including first and second windings connected to receive the output signal from said condition sensing means at said first winding of said transformer;

a first transistor including base, collector, and emitter connected to said transformer to receive an output signal from said second winding of said transformer between said base and emitter of said first transistor;

power supply means including first and second sources for supplying power;

a first impedance connected between said first source of power means and said collector of said first transistor;

first capacitor including first and second electrodes connected by said first electrode to said collector of said first transistor;

a second transistor including base, collector and emitter;

a first diode including first and second elements;

a second diode including first and second elements;

means connecting said second electrode of said first capacitor to said first element of said first diode and to said first element of said second diode;

a second capacitor connected between said base and emitter of said second transistor;

means connecting said second element of said first diode to said base of said second transistor;

a third transistor including base, collector and emitter;

means connecting said emitter of said first transistor to said second source of said power supply means;

a second impedance connected between said emitter of said third transistor and said second source of said power supply means;

a third capacitor connected between said base of said third transistor and said second source of said power supply means;

a third impedance connected between said base of said second transistor and said collector of said third transistor;

a fourth impedance connected between said emitter of said second transistor and said base of said third transistor;

connection means for connecting said second element of said second diode to said emitter of said second transistor;

a third diode including first and second elements, said first element of said third diode being connected to said base of said third transistor;

a fourth diode including first and second elements, said first elements of said fourth diode being connected to said second source of said power supply means;

a fourth capacitor connected by one electrode to said collector of said first transistor and by the other electrode of said second element of said third diode and to said second element of said fourth diode;

means connecting said emitter of said second transistor to said first source of said power supply means; and a load connected between said collector of said second transistor and said second source of said power supply means.

5. In switching apparatus:

a condition sensing circuit for providing an alternating output signal upon the occurrence of a predetermined condition;

a transformer including first and second windings connected to said condition sensing circuit to receive the output signal from said condition sensing circuit at said first winding of said transformer;

a first transistor including base, collector, and emitter, said first transistor being connected to said transformer for receiving an output signal from said second winding of said transformer between said base and emitter of said first transistor;

power means including first and second sources for supplying power;

a first impedance connected between said first source of said power means and said collector of said first transistor;

a first capacitor including first and second electrodes connected by said first electrode of said first capacitor to said collector of said first transistor;
a second transistor including base, collector and emitter;
a first diode including anode and cathode;
a second diode including anode and cathode;
means connecting said second electrode of said first capacitor to said anode of said first diode and to said cathode of said second diode;
a second capacitor connected between said base and emitter of said second transistor;
means connecting said cathode of said first diode to said base of said second transistor;
a third transistor including base, collector and emitter;
means connecting said second source of said power means to said emitter of said first transistor;
a second impedance connected between said emitter of said third transistor and said second source of said power means;
a third capacitor connected between said base of said third transistor and said second source of said power means;
a third impedance connected between said base of said second transistor and said collector of said third transistor;
a fourth impedance connected between said emitter of said second transistor and said base of said third transistor;
means connecting said anode of said second diode to said emitter of said second transistor;
a third diode including anode and cathode, said anode of said third diode being connected to said base of said third transistor;
a fourth diode including anode and cathode, said cathode of said fourth diode being connected to said second source of said power means;
a fourth capacitor connected by one electrode to said collector of said first transistor and by the other electrode to said cathode of said third diode and to said anode of said fourth diode;
means connecting said emitter of said second transistor to said first source of said power means;
a load connected between said collector of said second transistor and said second source of said power means; and
connection means connecting one of said sources of said power means to a reference potential.

6. Improved voltage doubling circuit apparatus comprising, in combination:
input means for supplying an input alternating signal;
output means for providing an output signal;
a first voltage doubling circuit connected to said input means for receiving the input signal therefrom and connected to said output means for supplying a unidirectional first signal thereto;
an impedance connected to said output means;
a second voltage doubling circuit connected to said input means, said second voltage doubling circuit supplying a unidirectional output second signal upon receipt of an alternating signal from said input means; and
switch means for providing high and low impedance conditions and thereby controlling a discharge path connected to said impedance and to said second voltage doubling circuit, said switch means being connected for receiving the second signal from said second voltage doubling circuit, and said switch means completing the discharge path in the absence of a signal from said input means, the switch means in combination with said impedance providing a high impedance circuit during operation of said first voltage doubling circuit and providing a low impedance discharge path when said first voltage doubling circuit is not receiving an input signal.

7. Improved voltage doubling circuit apparatus comprising, in combination:
input means for supplying an input alternating signal;
output means for providing an output signal;
a voltage doubling circuit connected to said input means for receiving the input signal therefrom and connected to said output means for supplying a unidirectional first signal thereto;
an impedance connected to said output means;
a signal converter connected to said input means, said signal converter supplying a unidirectional output second signal upon receipt of an alternating signal from said input means; and
a switch connected to said impedance and to said signal converter, said switch being connected for receiving the unidirectional second signal from said signal converter, and said switch completing a discharge path through said impedance in the absence of a signal from said input means, the switch in combination with said impedance providing a high impedance circuit during operation of said voltage doubling circuit and providing a low impedance discharge path when said voltage doubling circuit is not receiving an input signal.

References Cited by the Examiner

UNITED STATES PATENTS

| | | | |
|---|---|---|---|
| 2,305,845 | 12/42 | Cockerell | 340—253 |
| 2,647,237 | 7/53 | Herbst | 340—214 |
| 2,745,052 | 5/56 | Willemse | 320—1 |
| 2,956,268 | 10/60 | Kline | 340—248 |
| 2,994,073 | 7/61 | Pelovitz | 340—248 |
| 3,014,207 | 12/61 | Principale | 340—256 |
| 3,043,991 | 7/62 | Schneider et al. | 340—259 |
| 3,052,826 | 9/62 | Schneider et al. | 340—248 |

NEIL C. READ, *Primary Examiner.*